United States Patent Office 3,814,751
Patented June 4, 1974

3,814,751
PROCESS FOR PREPARING 6,6-DIFLUORO-17α,21-DIHYDROXY 16α-METHYL - 4-PREGNENE-3,20-DIONE
George Albert Boswell, Jr., Wilmington, Del., assignor to E. I. du Pont de Nemours and Company, Wilmington, Del.
No Drawing. Filed June 4, 1973, Ser. No. 366,880
Int. Cl. C07c 173/00
U.S. Cl. 260—239.55 R    4 Claims

ABSTRACT OF THE DISCLOSURE

The process involves heating a 21-bromo steroid compound, such as 21-bromo - 5α,6,6 - trifluoro-3β,17-α-dihydroxy-16α-methylpregnan - 20 - one, with anhydrous alkali metal alkanoate, such as sodium acetate, in the presence of a solvent for both the steroid compound and the alkali metal alkanoate, to replace the bromine atom with an acyl group. The resulting 21-ester steroid is itself an intermediate in the production of known biologically active steroid compounds.

BACKGROUND OF THE INVENTION

Field of the invention

This invention relates to improved processes for the preparation of 6,6-difluoro-17α,21-dihydroxy-16α-methyl-4-pregnene-3,20-dione, a precursor to known antiinflammatory and glucocorticoid agents, such as those shown in U.S. 3,546,215.

Prior art

U.S. Pat. 3,546,215 shows several 6,6-difluoro and 6,6,9α - trifluorocorticoids that are particularly useful as antiinflammatory compounds. Belgian Pat. 765,554 shows a method for the preparation of some of these compounds. The 17α-hydroxyl is converted to an ester to avoid side reactions in fluorinations of the 6-position. This ester group cannot be removed until after a 21-ester is introduced, i.e., a 21-ol must be present for hydrolysis of the 17-ester (by transesterification). However, the 17-ester interferes with 21-bromination and subsequent conversion to 21-ester. The latter requires expensive silver alkanoate reagent. It has not been heretofore known that the 17-ol could be introduced in these steroids after fluorination.

Ringold et al., J. Amer. Chem. Soc., 78, 820 (1956), show the bromination of a 17-OH steroid to form a 21-bromo compound. This is then converted to a 21-iodo compound which is then reacted with potassium acetate to produce a 17-OH, 21-acetate compound. The present process does not require the intermediate iodination step.

Lincoln et al., U.S. Pat. 3,174,965, disclose the insertion of bromine on the 21 position and then using a material such as sodium acetate to convert the bromo compound to a 21-acetate compound.

SUMMARY OF THE INVENTION

This invention is particularly concerned with the preparation of 21-acyloxy-5α,6,6-trifluoro-16α-methyl-3β,17α-dihydroxypregnan-20-one by reaction of an alkali metal lower alkanoate in an anhydrous media with the corresponding 21-bromo steroid. In the resulting compound sequentially, the 3-hydroxyl is oxidized to the 3-keto group, the 5α-fluorine removed and a 4(5)-double bond is introduced by alkali metal lower alkanoate, and the 21-acyloxy group hydrolyzed to 21-hydroxy by aqueous alkali to give the desired 6,6-difluoro-17α,21-dihydroxy-16α-methyl-4-pregnene-3,20-dione.

The reaction sequence involved in the invention is illustrated by the following Reaction Scheme:

REACTION SCHEME

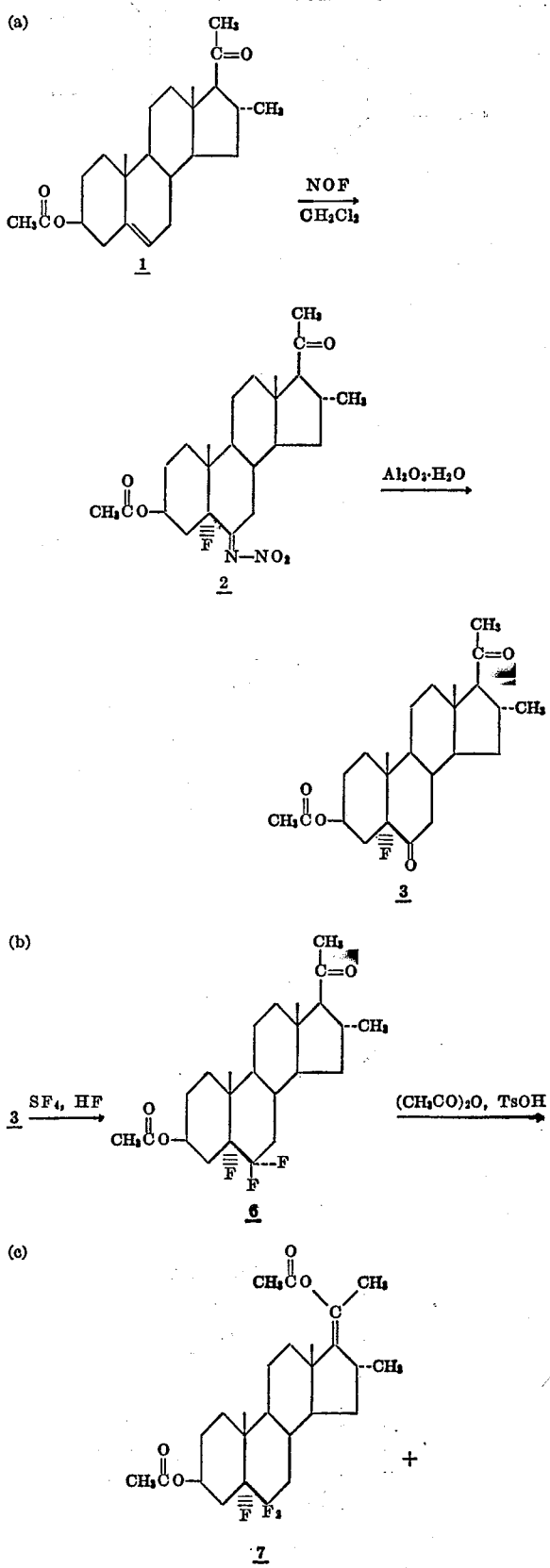

REACTION SCHEME—Continued (h)
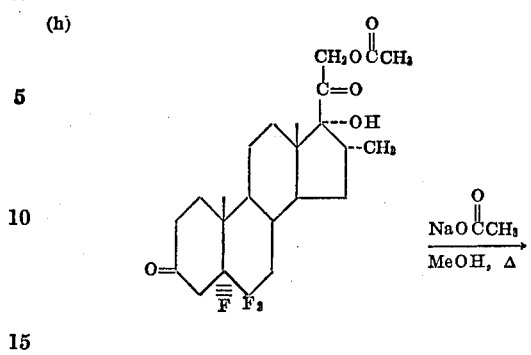
13

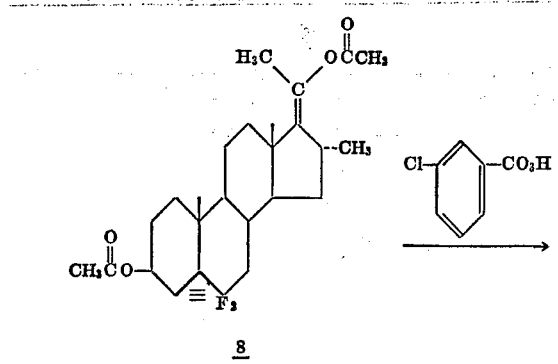
8

(d)
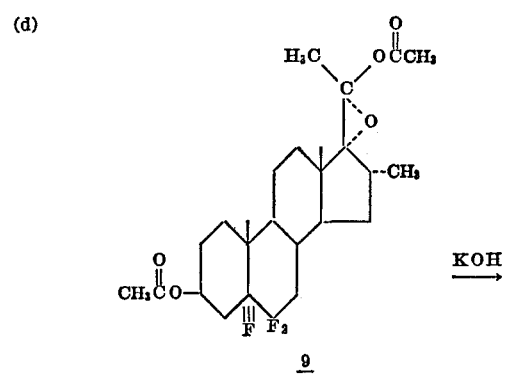
9

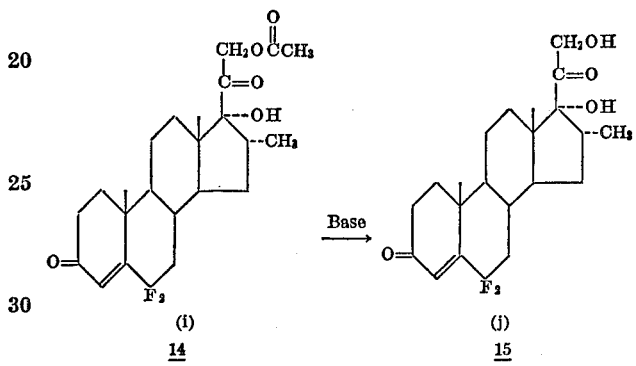
(i) 14    (j) 15

(e)
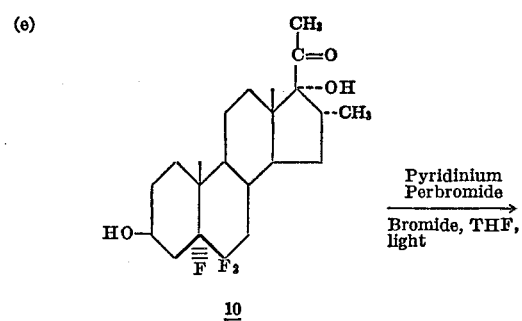
10

The 21 - bromo - 5α,6α,6β-trifluoro-3β,17α-dihydroxy-16α-methylpregnan - 20 - one employed in the above is made from commercially available 3β-hydroxy-16α-methyl-5-pregnen-20-one acetate by a sequence of reactions involving (a) reaction with nitrosyl fluoride followed by alumina treatment to give the 5α-fluoro-6-keto derivative, which is then (b) reacted with sulfur tetrafluoride to give 5α,6α,6β - trifluoro - 3β - hydroxy-6α-methylpregnan-20-one acetate, which is reacted (c) with a lower alkanoic anhydride such as acetic anhydride in the presence of an arylsulfonic acid to give the novel 5α,6,6-trifluoro-16α-methyl-17(20)-pregnene-3β,20 - diol diacetate, which (d) is epoxidized by an organic "per" acid to the novel corresponding 17α,20-oxido (epoxy) steroid, the latter (e) treated with aqueous alkali to give the 5α,6,6-trifluoro-3β,17α-dihydroxy-16α - methylpregnane-20-one, and the latter converted (f) to the 21-bromo compound by reaction with an organic perbromide in the presence of peroxide with the latter 21-bromo being replaced by (g) ester group of alkali metal alkanoate.

The novel steroids obtained in reactions (c) and (d) have the formulas (A) and (B):

(f)
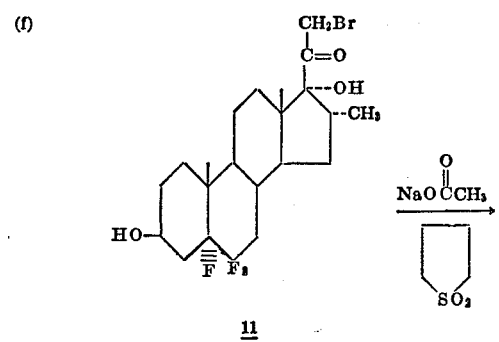
11

(g)
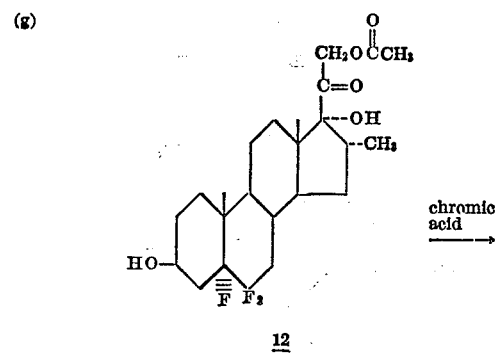
12

(A)
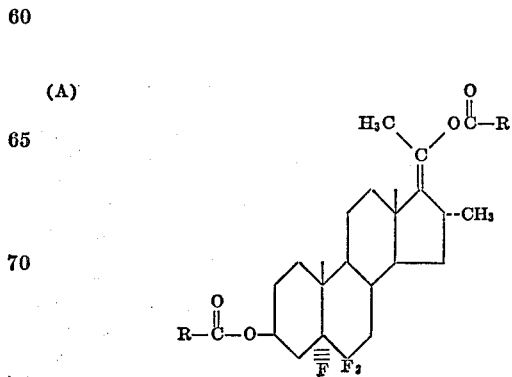

(B)

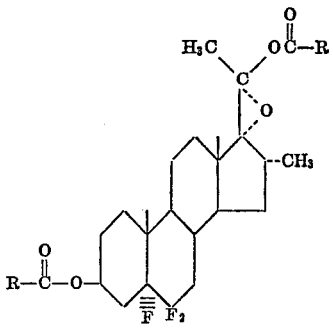

wherein R is H or alkyl of 1–3 carbon atoms, especially methyl.

The new processes of this invention and particularly the combination of introduction of the 17α-hydroxyl by steps (c) and (d) above to give new steroids followed by bromination and replacement of the bromine by use of an alkali metal alkanoate, provide more facile introduction of the 21-hydroxyl function than heretofore available in this class of corticoidal intermediates. The insertion of bromine and its subsequent replacement occur more readily than with 17α-acetoxy-pregnane-20-ketones since the ester groups are believed to hinder bromination and replacement on the 21-position.

The sequence of reactions herein described can be carried out as a laboratory or large scale operation. The reaction (a) of nitrosyl fluoride with 3β-hydroxy-16α-methyl-5-pregnen-20-one lower alkanoate (1–4 carbons) takes place at temperatures of 0–50° in an inert solvent such as liquid chlorinated hydrocarbon for times of a few minutes to several hours. Treatment with neutral alumina (e.g., activity grade III) under the same conditions gives the 5α-fluoro-6-keto steroid which is converted by reaction (b) to the 5α,6α,6β - trifluoro by sulfur tetrafluoride usually at lower temperatures (−10 to +10°) for 1 to 24 hours in the presence of hydrogen fluoride. After removal from the fluorinating reagents, reaction (c) of the trifluoro steroid with a lower (1–4 carbon) alkanoic anhydride in the presence of a strong organic acid, preferably an aryl sulfonic acid of 6–7 carbons at 75–150° C. gives the 17(20) - pregnene-20-alkanoate. The latter double bond is epoxidized by a peroxy acid such as an organic peracid (of a 2–7 carbon acid) including peracetic, perbenzoic, perhalobenzoic, generally at 0–50° C. An aqueous alkali metal hydroxide, generally in a lower (1–4 carbon atoms) alkanol, transforms the 17(20)-epoxy or oxido group to 17α - hydroxy-20-keto steroid, reaction (e). The latter compound is monobrominated (f) in the 21-position preferably by a strong brominating agent, such as a tertiary amine bromide perbromide in the presence of a peroxygen compound at 0–50° or by bromine in an organic solvent by slow addition of the brominating agent to the steroid. This bromine is replaced by reaction with anhydrous alkali metal alkanoate of a 1–4 carbon acid in an inert solvent such as sulfolane at temperatures of 75–150° for times of 1–10 hours, reaction (g), to give 5α,6α,6β-trifluoro-16α-methyl-3β,17α,21-trihydroxypregnan-20-one 21-alkanoate.

It is preferred to carry out reaction (g) in an inert atmosphere but it can be carried out in other than inert atmospheres. The solvent is one which is stable at the reaction temperatures used and is a good solvent for both the alkali metal alkanoate and the steroid compound. Examples of other suitable solvents include acetonitrile and dimethylformamide. It is also preferred that the solvent be anhydrous. The temperature of the reaction is that at which the solvent is in liquid phase. The time of reaction will depend on the temperature; the higher the temperature, the faster the reaction.

The products thus available by the sequence of reactions described are useful for the further preparation of corticoidal steroids. For example, 6,6-difluoro-17α,21-dihydroxy-16α-methylpregn-4-ene-3,20-dione (15) and its 21-esters have been found to be particularly valuable as intermediates in preparing topically active antiinflammatory and corticoidal compositions, such as are disclosed in Fried U.S. 3,546,215. Particularly active compounds of the latter type are 6,6,9α-trifluoro-11β,17α,21-trihydroxy-16α-methyl-4-ene-3,20-dione and 6,6,9α-trifluoro-11β,17α,21 - trihydroxy - 16α-methylpregna-1,4-diene-3,20-dione. Also useful but generally less active are 6,6-difluoro-11β,17α,21-trihydroxy-16α-methylpregn-4-ene-3,20-dione and 6,6 - difluoro-11β,17α,21-trihydroxy-16α-methylpregna-1,4-diene-3,20-dione. They show good to excellent topical antiinflammatory activity relative to fluocinoline acetonide as determined by assay of rat ear treated with croton oil. They also show activity as vasoconstrictors by the Stoughton-McKenzie assay. The corresponding hydrolyzable C–21 esters are also biologically active.

SPECIFIC EMBODIMENTS OF THE INVENTION

In the following experimental work all percentages are by weight and all temperatures are centigrade unless otherwise noted. Molecular weights were determined by direct injection mass spectrometry. Unless indicated to the contrary, all NMR spectra were taken in deuterochloroform.

EXAMPLE

6α,6β-difluoro-17α,21-dihydroxy-16α-methyl-4-pregnene-3,20-dione 21-Acetate (14)

(a) 5α - fluoro - 3β-hydroxy-16α-methylpregnane-6,20-dione acetate (3).—

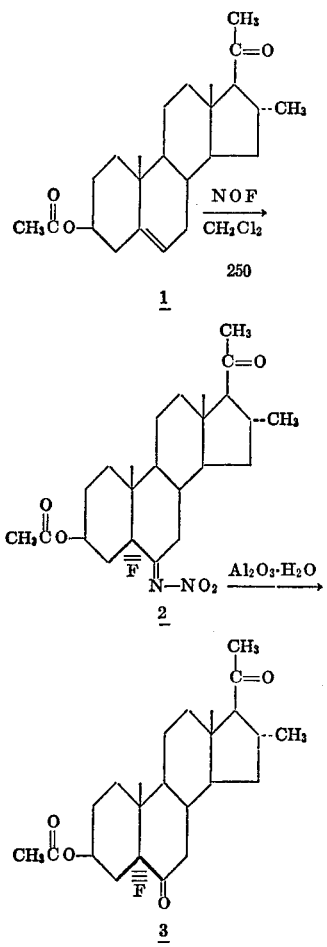

Into a stirred solution of commercially available 3β-hydroxy-16α-methyl-5-pregnen-20-one acetate (1, 120 g., 0.29 moles about 90% purity), which had been dried overnight at 60° under reduced pressure, and methylene chloride (300 ml.) in a polythene bottle, was passed a slow stream of nitrosyl fluoride (NOF) by means of a polythene dispersion tube hooked directly to a tared cylinder of NOF. The dispersion tube is one with several small holes in it. The polythene reaction vessel was immersed in a water bath maintained at about 25°. The polythene reactor was vented into a second polythene bottle which contained a solution of 1 (35 g.) and methylene chloride (100 ml.). The system was thoroughly sparged with dry nitrogen before introduction of NOF. Nitrosyl fluoride was bubbled into the stirred solution at a rate of 8–9 g./hr. in a system free of leaks.

The run was stopped after 5 hours during which time the color changed through yellow, brown, purple to green. An aliquot was withdrawn, washed with water and with saturated salt solution, dried over $MgSO_4$ and evaporated to dryness to leave a crystalline residue. The IR spectrum showed the material to be 5α-fluoro-6-nitrimino intermediate 2

($\lambda_{max.}^{neat}$ 5.75, 5.88, 6.10, 6.30, 8.0, 8.6μ).

After stirring for 1.5 hour at room temperature, the remaining green reaction mixture was slowly poured into water (600 ml.) containing sodium bicarbonate (72 g.). This mixture was stirred for 15 minutes following which it was transferred to a separatory funnel and the methylene chloride phase was separated. The aqueous phase was then twice extracted with 100 ml. portions of additional methylene chloride. The combined methylene chloride solutions were slowly added to a stirred mixture of neutral Woelm alumina (activity II, 1 kg.) and methylene chloride (500 ml.) cooled in an ice bath. The slurry was stirred for 5 hours at ambient temperature. The IR spectrum of an aliquot showed that hydrolysis of the nitrimine was complete ($\lambda_{max.}^{Nujol}$ 5.80 (s), 5.88 (m), 8.15 (s), 8.65μ (m)).

The alumina was removed by filtration and the tan filter cake was thoroughly washed with four 500 ml. portions of methylene chloride. The combined methylene chloride fractions were concentrated on a steam bath to a volume of 400 ml. Acetone was slowly added to displace the methylene chloride followed by hexane until the product began to crystallize; the temperature of the solution had reached 65°. The mixture was allowed to cool to room temperature after which it was further cooled in an ice bath with stirring. The product was collected on a filter, washed with cold acetone/hexane and air-dried to give a first crop of 83 g. (70%) of colorless 5α-fluoro-3β-hydroxy-16α-methylpregnane-6,20-dione acetate (3).

The mother liquors were concentrated and a second crop of colorless product weighing 9.82 g. (8.3%) was obtained. The mother liquors from this crystallization were concentrated under reduced pressure to give a brown syrup weighing 26.10 g. Trituration with acetone resulted in partial crystallization. The IR spectrum showed carbonyl (5.78 and 5.88), imine (6.0), nitro (6.4 and 6.6), ester (8.15) and fluorine bands (8.65μ). This material was chromatographed on 750 g. of neutral alumina (activity III). Elution with benzene and benzene containing increasing amounts of ether (1–10% by vol.) brought off 10.40 g. of crystalline 3. Thin layer chromatography showed only one spot whereas the earlier fractions showed two spots, possible due to 5α-fluoro-6-one 3 and 5α-fluoro-6-nitrimine 4. Recrystallization from acetone-hexane afforded 6.50 g. (5.6% 1st crop); M.P. 181–185°.

The analytical sample was recrystallized from methylene chloride/hexane: M.P. 183–187°; $\alpha_D^{24}$ +30° (c. 1.36 Chf).

*Analysis.*—Calcd. for $C_{24}H_{35}FO_4$ (406.5): C, 71.0; H, 8.68; F, 4.67. Found: C, 71.00, 71.16; H, 8.74, 8.72; F, 5.05, 5.09.

A second crop was gummy. The IR spectrum showed strong imine (6.0), nitro (6.4) and fluorine bands (8.65μ).

A total yield of 99.3 g. (84.5%) of pure 3 was thus obtained.

A major by-product appears to be 5α - fluoro-3β-hydroxy-16α-methyl-6-nitriminopregnan-20-one acetate (4) contaminated by some nitroolefin (5) ($\Delta^5$-6-nitro).

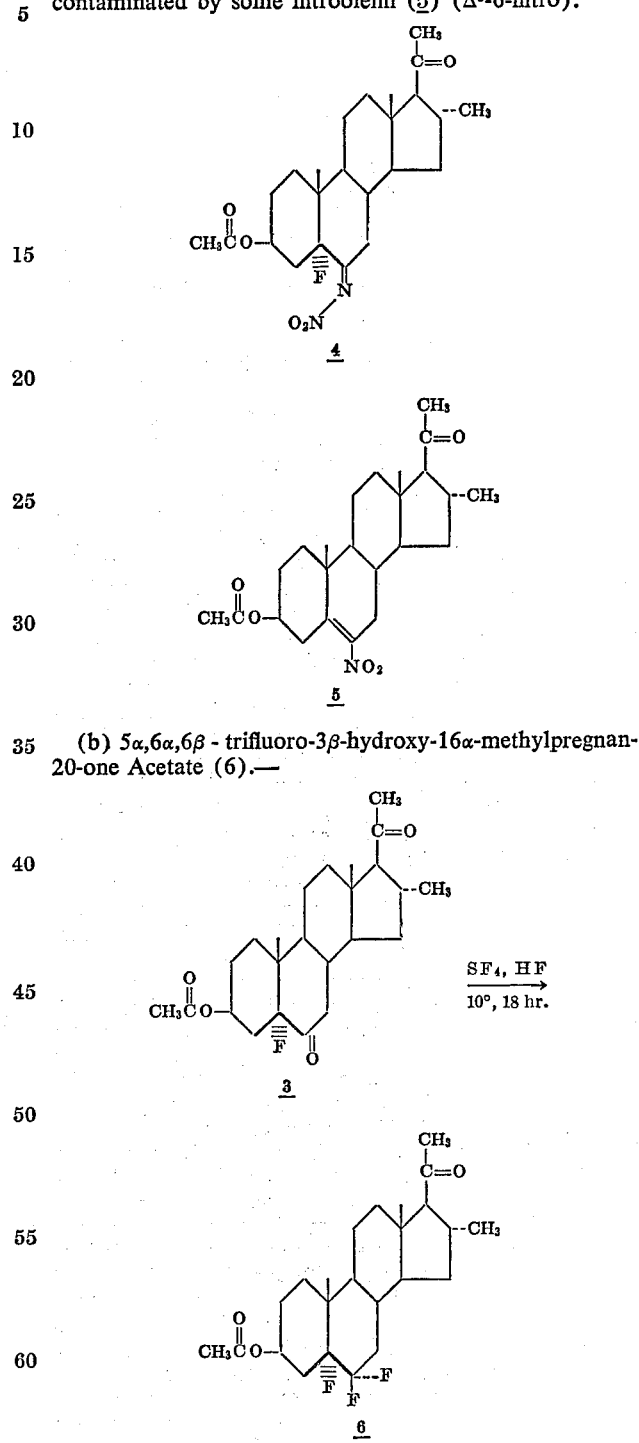

(b) 5α,6α,6β - trifluoro-3β-hydroxy-16α-methylpregnan-20-one Acetate (6).—

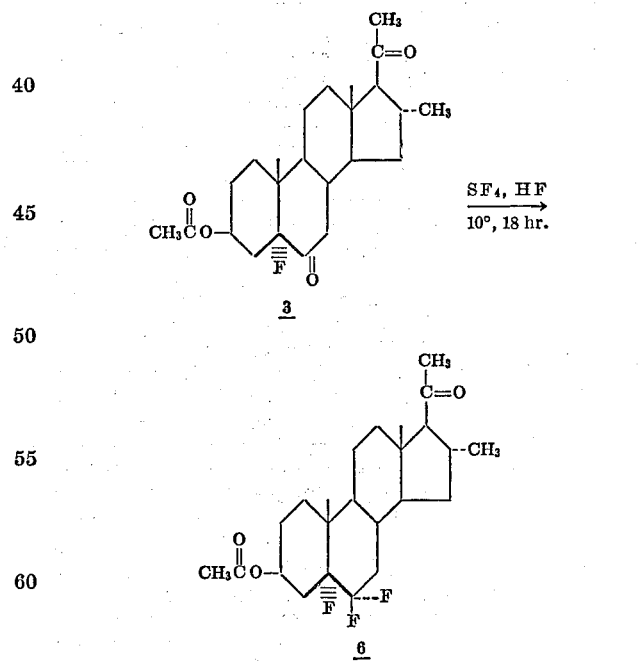

A 1.2 l. Hastelloy rocker autoclave was charged with a solution of the 5α-fluoro-6-one 3 (83.0 g., 0.20 mole) and methylene chloride (400 ml.). The autoclave was cooled in solid carbon dioxide-acetone and evacuated. Twenty-six grams (1.35 moles) of anhydrous hydrogen fluoride followed by 87 g. (0.81 mole) of purified sulfur tetrafluoride was distilled into the autoclave. The contents of the autoclave were allowed to warm to +10° and kept at that temperature by external cooling for 18 hours, at the end of which time the autoclave was vented, the reaction mixture was poured cautiously into a 1-gallon widemouth polythene bottle containing about 1 kg. of ice. The autoclave was rinsed twice with 100-ml. portions of methylene chloride and the rinses added to the polythene bottle. With a paddle stirrer, the methylene chloride-water mixture was stirred vigorously until bubbling ceased. The upper aqueous layer was drawn off by water aspirator suction. Washing was repeated with three additional one liter portions of water, excess NaHCO₃ (50 g.) being slowly added to the aqueous layer in the final wash. The amber methylene chloride solution was transferred to a separatory funnel and washed successively with saturated sodium bicarbonate solution, water and saturated brine solution. After being dried over anhydrous magnesium sulfate solution, the solution was concentrated to a volume of 400 ml. Hexane was added (~200 ml.) and the solution was further concentrated on a steam bath until the product began to crystallize. After cooling and collection of the light tan solid by suction, there was obtained 62.0 g. (73%) of 5α,6α,6β - trifluoro-3β-hydroxy-16α-methylpregnan-20-one acetate (6) as a 1st crop: M.P. 137–138°; [α]$_D^{25}$ +41° (c. 1.02, Chf);

$\lambda_{max}^{Nujol}$ 5.78, 5.88, 8.15, 8.65μ;

HR Mass Spec. calcd. for C₂₄H₃₅F₃O₃: 428.2536. Found: 428.2581; ¹H NMR (60 MHz): δ=2.10 (s) (21–H); 2.0 (s) (21–OAc); 1.12, 1.08, 1.04 (t) (19–H); 1.02, 0.90 (d) (16-Me); 0.68 (s) (18–H).

(c) 5α,6α,6β - trifluoro-16α-methyl-17(20)-pregnene-3β, 20-diol Diacetate (7) and (8).—

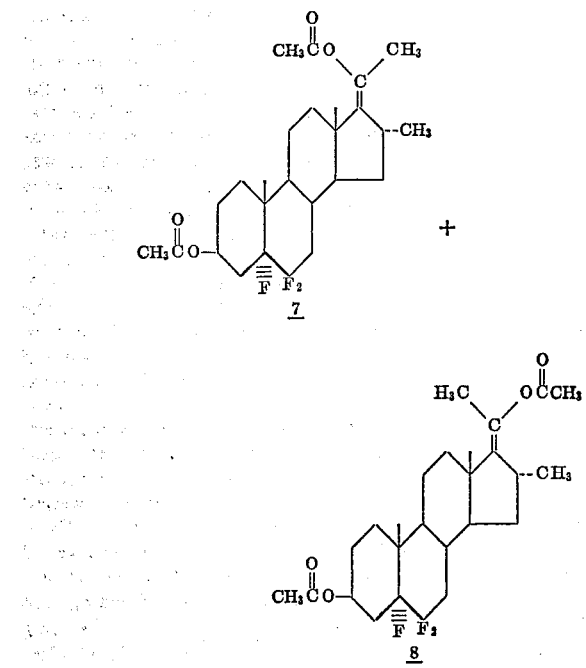

5α,6α,6β-trifluoro-3β-hydroxy-16α-methylpregnane-20-one acetate (6, 24 g.) and p-toluenesulfonic acid, TsOH, (5.2 g.) were dissolved in acetic anhydride (1.2 liters) and the reaction mixture was subjected to slow distillation for 15 hours during which time about 800 ml. of distillate was collected. The cooled solution was diluted with benzene (2 liters) and then successively washed with cold 5% potassium hydroxide solution, water and saturated brine solution. The dark organic phase was dried over anhydrous magnesium sulfate, concentrated to about 500 ml. under reduced pressure and adsorbed onto a column of ethyl acetate washed neutral alumina of activity I (500 g.).

Elution of the column with hexane returned 17–18 grams of Δ17(20)-enol acetate as a colorless glass which based on the ¹H NMR spectrum is a mixture of the two possible isomers 7 and 8. Further elution with hexane containing 12.5 to 50% benzene (by volume) and finally pure benzene gave an additional 3.5 to 4.5 g. of material. A total of 21.50 g. (82%) of Δ17(20)-enol acetate was obtained suitable for carrying on to the next step. The viscous syrup, which could not be obtained in crystalline form, had the following spectral data:

$\lambda_{max}^{neat}$ 5.75 (s) (acetate carbonyls), 5.88 (w) (Δ17 (20)-ene), 8.05μ (s) (acetate carbon-oxygen stretch);

¹H NHR (60 MH₃) (CDCl₃); δ=2.07 (s, 21–H), 2.02 (s, 3,20–OAC's), 1.12, 1.07, 1.04 (t, 19–H), 1.03, 0.92 (d, 16–CH₃), 0.87 (s, 18–H), 0.67 (s, 18–H).

(d) 5α,6α,6β-trifluoro-16α-methyl-17α(20)-oxidopregnane-2,20-diol diacetate (9).—

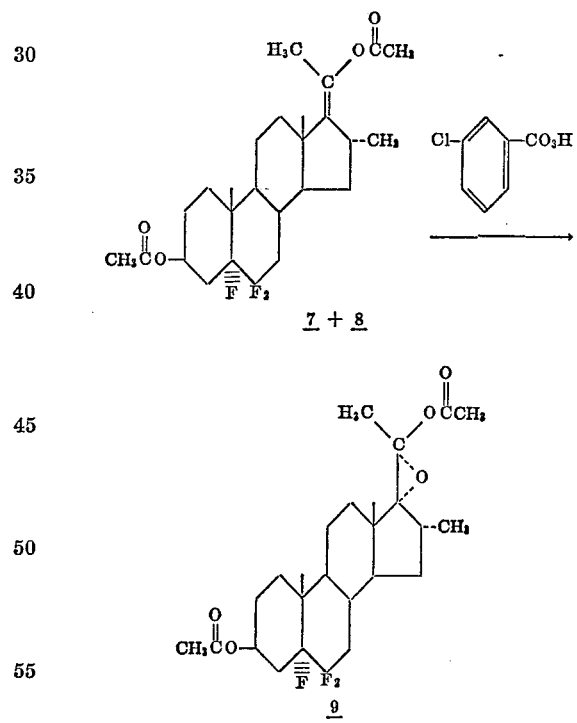

To a stirred solution of the above mixed Δ17(20)-enol acetates (7+8) (14.0 g., 29.8 mmoles) and chloroform (Chf) (250 ml.) at 25° was added a solution of m-chloroperbenzoic acid (5.87 g., about 85% pure, 28.8 mmoles) and chloroform (~100 ml.). The resulting solution was stirred at ambient temperature for 16 hours. Excess m-chloroperbenzoic acid was destroyed by the slow addition of 10% sodium sulfite until a test with starch-iodide paper was negative. The mixture was then transferred to a separatory funnel and the organic layer was washed with 10% sodium bicarbonate solution to extract m-chlorobenzoic acid. The chloroform phase was washed with water and saturated brine solution, dried over anhydrous magnesium sulfate, and evaporated to dryness under reduced pressure. The residual oil crystallized when triturated with methanol to give 5α,6α,6β-trifluoro-16α- methyl-17α(20)-oxidopregnane-3,20-diol diacetate, 9, 3.28 g., 23%): M.P. 210° (rapid);

$\lambda_{max}^{Nujol}$ 5.70, 8.10μ.

The analytical sample was recrystallized from methylene chloride: M.P. 210–213°; $[\alpha]_D^{25}$ —22° (c. 1.01, Chf); 'H NMR (CDCl₃, TMS) Hz. at 60 MHz.: 120 (s, 3 and 20–OAc's); 100 (s, 21–H); 67, 64.5, 62 (t, 19–H); 56 (s, 18–H); 54 and 46 (d, 16–CH₃). F NMR (56, 4 MHz.) Hz.; 9430, 7470 (d, 5α–F); 6000 (t, 6–F's).

Analysis.—Calcd. for $C_{26}H_{37}F_3O_5$ (486.56): C, 64.3; H, 7.65; F, 11.7. Found: C, 64.44, 64.13; H, 7.64, 7.48; F, 11.53.

(e) 5α,6α,6β-trifluoro-3β,17α-dihydroxy-16α - methylpregnan-20-one (10).—

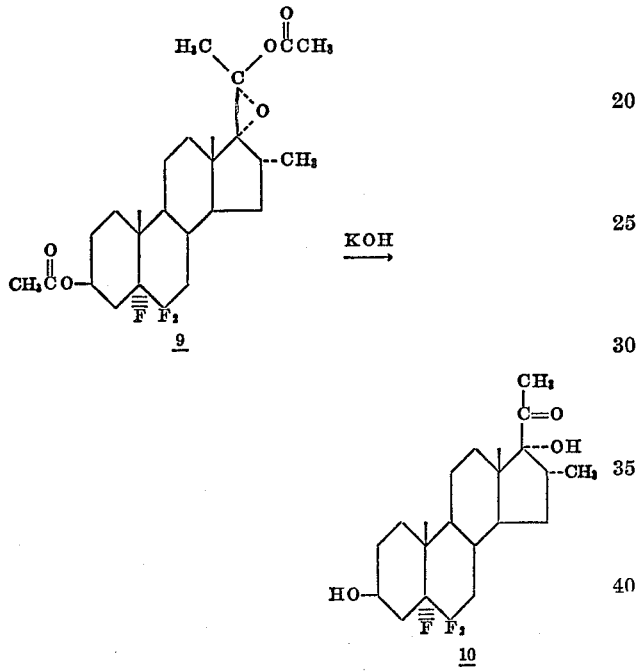

The methanolic mother liquors from the preparation of 5α,6α,6α-trifluoro-16α-methyl-17α-(20)-oxidopergnane-3,20-diol diacetate (9) in step (d) above were treated with a solution of KOH (12.8 g.) in water (25 ml.) for 1 hour at room temperature under nitrogen. Acetic acid (15 ml.) was then added and the dark soultion was diluted with water and allowed to stand at room temperature for 2 days. The precipitated solid was collected by filtration, washed well with water and air dried, yield 3.57 g. (29.8% based on enol acetate 7). Recrystallization from acetone/hexane gave 5α,6α,6β-trifluoro - 3β,17α - dihydroxy-16α-methylpregnan-20-one (10, 1.79 g., 1st crop); M.P. 232–235°: A second crop of 0.74 g. was obtained. The analytical sample was crystallized once again from acetone, M.P. 233–235°: $[\alpha]_D^{25}$ —27° (c. 1.02, Chf);

$\lambda_{max}^{Nujol}$ 2.78, 2.90, 3.03, 5.87, 9.53μ;

'H NMR (d-DMSO, TMS) Hz. at 60 MHz.; 197 (s, OH); 126 (s, 21–H); 62, 59, 57 (t, 19–H); 50.43 (d, 16–CH₃); 35 (s, 18–H).

Anal.—Calcd. for $C_{22}H_{35}F_3O_3$ (402.48): C, 65.7; H, 8.27; F, 14.15. Found: C, 66.12, 66.19; H, 7.65, 8.42; F, 12.97, 12.80.

High resolution mass spectrometry (direct injection source: 180–250°) showed a 402 and a 386 m/e, Mass measurement of the M⁺s

| Measured | | Calculated |
|---|---|---|
| 402.2393 | $C_{22}H_{33}F_3O_3$ | 402.2380 |
| 386.2423 | $C_{22}H_{33}F_3O_2$ | 386.2431 |

The sample contains what appears to be a trace of 5α,6α,6β-trifluoro-3β-hydroxy-16α - methylpregnan - 20-one (6) as a result of incomplete enol acetylation or some hydrolysis during workup in step (c).

A total of 16.5 g. of recrystallized 5α,6α,6β-trifluoro-3β,17α-dihydroxy-16α-methylpregnan-20-one (10) was obtained upon combining step (d) with the above using 21.3 g. of enol acetates 7–8.

(f) 21-bromo-5α,6α,6β-trifluoro - 3β,17α - dihydroxy-16α-methylpregnan-20-one (11).

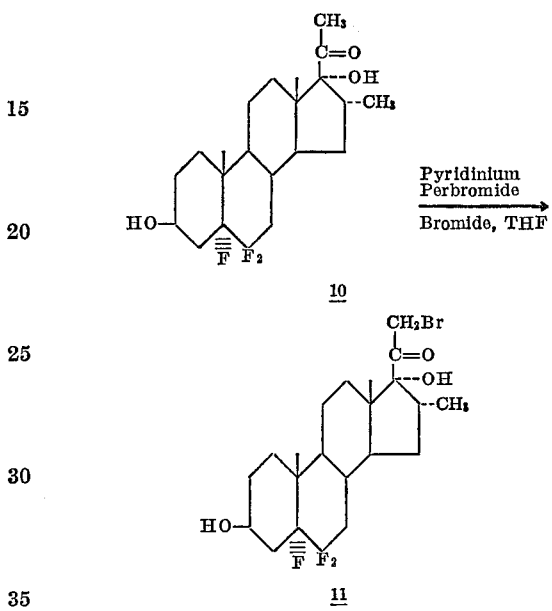

To a stirred solution of 11.75 g. (29.2 mmoles) of diol 10 and peroxide-free tetrahydrofuran (THF) (125 ml.) at 25° was added dropwise a solution of pyridinium perbromide (10.25 g., 1.1 mole-equivalents assuming the reagent to be 100% pure) in peroxide-free THF (50 ml.). No precipitate of pyridinium bromide formed and the color remained a deep red indicating that no bromination had taken place. Four drops of 48% hydrogen bromide in glacial acetic acid and 500 ml. of "non-purified" THF was added. No precipitate or color change was observed. A 5-ml. aliquot was removed from the reaction and exposed to bright sunlight. A precipitate formed immediately. The aliquot containing the heavy precipitate of pyridinium bromide was returned to the reaction flask. Within 10 minutes a heavy precipitate had formed and the color had changed from a deep red to yellow. A thin layer chromatograph (TLC) of an aliquot clearly showed a new spot migrating just ahead of the strating diol (ether/benzene 1:1). Based on the relative intensities, the reaction was judged to be about 50% complete. A TLC taken after 3½ hours showed no change and starch-iodide paper showed no more reagent remained. Over the next 12 hours, an additional 10 g. of pyridinuim perbromide bromide in 50 ml. of THF was added while the progress of the bromination was followed by TLC and starch-iodide paper. It was apparent that the pyridinium perbromide bromide reagent being used was not pure. This was confirmed by its melting point >85°. After about 7 hours more, the TLC of an aliquot indicated that bromination was essentially complete.

The reaction mixture was diluted with water with vigorous stirring while the bromination product precipitated as a white granular solid. This was collected by filtration, washed well with water, air-dried for 24 hours and then dried in a vacuum oven at 50–60° for 3 hours, yield 14.20 g. (~100%). The 'H NMR showed the product to have the desired structure: 'H NMR (CDCl₃, TMS+3 drops of DMSO-d₆) Hz. at 60 MHz.: 281, 266, 258, 242 (AB-quartet, 21–H); 65, 62, 59 (t, 19–H); 57, 50 (d, 16–CH₃); 42 (s, 18–H). TCL (1:1 ether/benzene) showed only one spot migrating slightly faster than the starting material.

The total crude product was recrystallized from methanol containing a few drops of water to give a total of 13.50 g. (96%) in 3 successive crops (9.10, 4.13 and 0.27 g., respectively). The first crop melted at 205° with sintering at 145–155°.

The analytical sample was recrystallized from methanol to give colorless leaflets: M.P. 212–213°; $[\alpha]_D^{25}$ +31° (c. 1.00, Chf).

*Anal.*—Calcd. for $C_{22}H_{32}BrF_3O_3$ (481.40): C, 54.8; H, 6.7; Br, 16.6; F, 11.83. Found: C, 53.26, 53.29; H, 6.90, 6.85; Br, 16.41, 16.55; F, 11.39, 11.32.

(g) 5α,6,6-trifluoro - 16α-methyl-3β,17α,21-trihydroxy-pregnan-20-one 21-acetate (12).—

(h) 5α,6α,6β-trifluoro-17α,21 - dihydroxy-16α-methyl-pregnane-3,20-dione 21-acetate (13).—

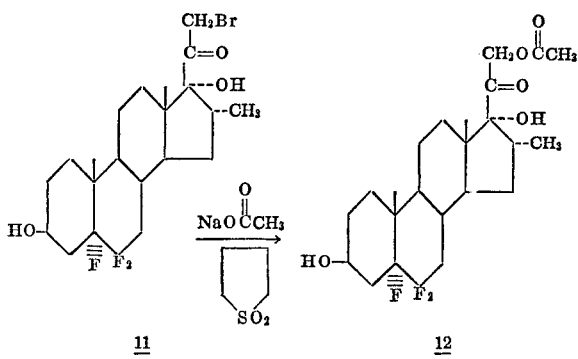

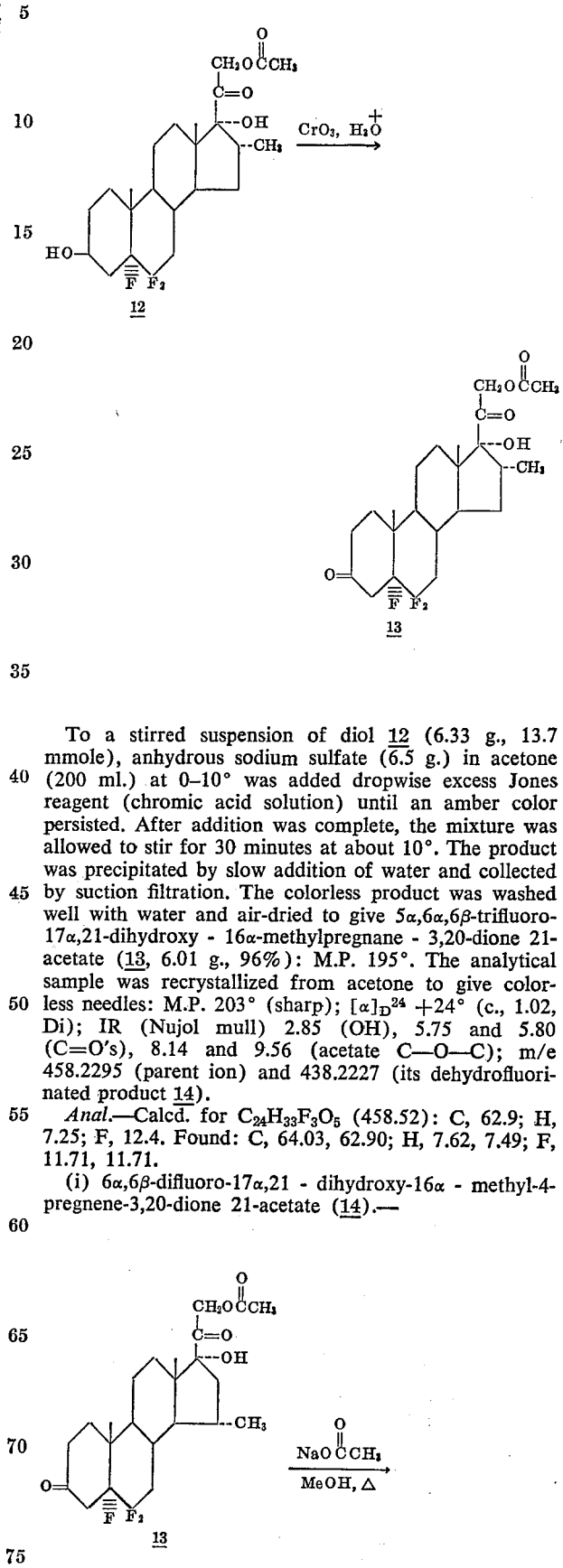

A stirred suspension of 21-bromo-5α,6α,6β-trifluoro-3β,17α-dihydroxy - 16α - methylpregnan-20-one (11, 8.76 g., 18.2 mmole) anhydrous sodium acetate (40 g.) and sulfolane (250 ml.) was heated under nitrogen for 2 hr., the temperature being held between 95 and 130°. The tan reaction mixture was cooled to room temperature and diluted with water. The resultant fine white precipitate was collected by suction filtration, washed well with water and air-dried. The crude product was recrystallized from acetone-methanol to give 5α,6α,6β-trifluoro-16α - methyl-3β,17α,21-trihydroxypregnan - 20-one 21-acetate [12; 5.45 g. (1st crop), 1.22 g. (2nd crop), and 0.66 g. (3rd crop)] in 87.5% yield. The original mother liquors yielded additional crude 12 (0.097 g.). The first crop melted at 231–234°. Recrystallization from acetone-methanol afforded colorless needles, M.P. 232–233°. The ¹H NMR (CDCl₃) was identical to a product obtained by the above general procedure but starting with about 0.7 g. of 11. The product, 5α,6α,6β-trifluoro-3β,17α,21-trihydroxy - 16α-methylpregnane-20-one 21-acetate (12), was obtained as well-formed cololess leaflets: M.P. 219–220°;

$[\alpha]_D^{25}$ +10° (c 1.01, Di); $\lambda_{max}^{Nujol}$ 2.82, 2.94, 3.03 (OH), 5.82 (C=O's), 8.04 (acetate C—O—C), 9.56μ, (C—OH and/or C—F);

¹H NMR (CDCl₃, TMS) Hz. at 60 MHz.: 295, 284 (d, 21–H); 147 (s, OH); 128 (s, OAc); 65, 62, 59 (t, 19-H); 58, 50 d, 16–CH₃), 45 s, (18–H).

*Anal.*—Calcd. for $C_{24}H_{35}F_3O_5 \cdot \frac{1}{2}H_2O$ (469.52); C, 61.5; H, 7.65; F, 12.16. Found: C, 61.31, 61.18; H, 7.57, 7.59; F, 12.24, 11.92.

To a stirred suspension of diol 12 (6.33 g., 13.7 mmole), anhydrous sodium sulfate (6.5 g.) in acetone (200 ml.) at 0–10° was added dropwise excess Jones reagent (chromic acid solution) until an amber color persisted. After addition was complete, the mixture was allowed to stir for 30 minutes at about 10°. The product was precipitated by slow addition of water and collected by suction filtration. The colorless product was washed well with water and air-dried to give 5α,6α,6β-trifluoro-17α,21-dihydroxy - 16α-methylpregnane - 3,20-dione 21-acetate (13, 6.01 g., 96%): M.P. 195°. The analytical sample was recrystallized from acetone to give colorless needles: M.P. 203° (sharp); $[\alpha]_D^{24}$ +24° (c., 1.02, Di); IR (Nujol mull) 2.85 (OH), 5.75 and 5.80 (C=O's), 8.14 and 9.56 (acetate C—O—C); m/e 458.2295 (parent ion) and 438.2227 (its dehydrofluorinated product 14).

*Anal.*—Calcd. for $C_{24}H_{33}F_3O_5$ (458.52): C, 62.9; H, 7.25; F, 12.4. Found: C, 64.03, 62.90; H, 7.62, 7.49; F, 11.71, 11.71.

(i) 6α,6β-difluoro-17α,21 - dihydroxy-16α - methyl-4-pregnene-3,20-dione 21-acetate (14).—

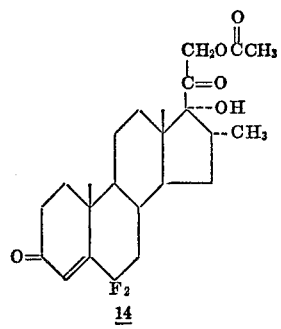

A stirred suspension of dione 13 (5.35 g., 11.65 mmole) and anhydrous sodium acetate (10 g.) in methanol (50 ml.) was heated to reflux under nitrogen for 1 hr. after which stirring was allowed to continue overnight at room temperature. The suspension was diluted with water, and the colorless solid was collected by filtration, washed well with water and allowed to air dry. It was further dried in a vacuum oven: yield 4.82 g.; M.P. 205–207°. Recrystallization from acetone afforded colorless needles (3.33 g. in 3 crops). The first crop had the following physical constants: M.P. 205–207° [α]$_D^{24}$ +22° (c. 1.02, Di); UV$_{max}$ (EtOH) 226 (ε3490) and 290 mμ (95); mass spectrum m/e 438.2227 (M+ for 14, intense), 460 (M+ for diol 12, moderately intense), 458.2295 (M+ for dione 13, weak).

Anal.—Calcd. for $C_{24}H_{32}F_2O_5$ (438.22): C, 65.6; H, 7.35; F, 8.60. Found: C, 63.63; H, 7.35; F, 10.77.

Thin layer chromatography revealed 3 spots with R$_f$s' corresponding to authentic diol 12, dione 13 and 6,6-difluoro-Δ$^4$-3-one 14. Thus the oxidation reaction (h) and the dehydrofluorination reaction (i) were not complete.

Purification was accomplished by dissolving the above material in chloroform and applying the solution to an alumina column (150 g., neutral, Act III). Elution with 10 to 50% ether-benzene. Fractions 18–25 (1.0 g.), the desired enone 14 by TCL, were recrystallized from acetone-hexane to give 6,6-difluoro-17α,21-dihydroxy-16α-methyl-4-pregnene-3,20-dione 21-acetate (14, 0.73 g.): M.P. 212–215°; [α]$_D^{25}$ +21° (c. 1.00, Chf); IR (Nujol mull) 2.88 (OH), 5.69, 5.74 and 5.88 (C=O's), 8.13μ (acetate C—O—C); UV$_{max}$ (EtOH) 227 (ε 12,000) and 294 mμ (88). The mass spectrum exhibits a mol ion (M+) at m/e 438.2192 (calcd. 438.2216) and major fragments at 379

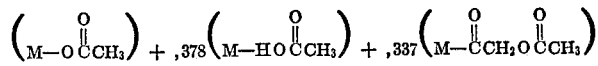

and (337–H$_2$O); NMR (60 MHz.) Hz. 377 (d, J=4 Hz., 4–H), 293, 297 (d, 21–H), 129 s, 21–OAc), 78, 75 (d, 19–H), 59, 52 (d, 16–Me), 49 (18–H).

Anal.—Calcd. for $C_{24}H_{32}F_2O_5$: C ,65.6; H, 7.35; F, 8.6. Found: C, 65.86, 66.06; H, 7.23, 7.03; F, 8.67, 8.90.

Treatment of the latter compound (14) with molar amounts of potassium carbonate in excess water with tetrahydrofuran and methanol mixture at reflux for an hour followed by stirring for 2 hrs. gives 6,6-difluoro-17α,21-dihydroxy-16α - methylpregn-4-ene - 3,20-dione, (15) M.P. 202–7°. Compound (15) can then be used, for example, as the starting material in Step F of Belgian Pat. 765,554 in proceeding on to biologically active steroids.

We claim:
1. A compound having a formula selected from the group

(A) 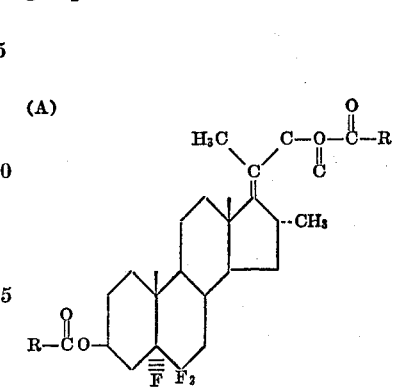

and (B) 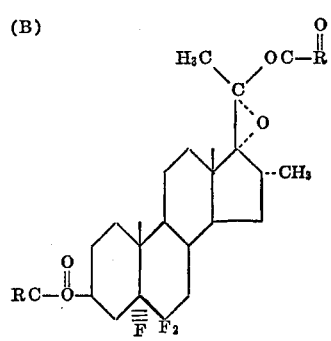

wherein R is H or alkyl of 1–3 carbon atoms.

2. A compound according to claim 1 having the formula (A) where R is methyl.

3. A compound according to claim 1 having the formula (B) where R is methyl.

4. A process for the preparation of 5α,6,6-trifluoro-16α-methyl - 3β,17α,21 - trihydroxypregnan - 20 - one alkanoate which comprises the sequential steps of (a) contacting 5α - fluoro-3β-hydroxy-16α-methylpregnane-6,20-dione lower alkanoate with nitrosyl fluoride at 0–50° C. in an inert liquid chlorinated hydrocarbon to form the corresponding 5α-fluoro-6-nitrimino compound;

(b) contacting the product of step (a) with neutral alumina to form the corresponding 5α-fluoro-6-keto compound;

(c) contacting the product of step (b) with sulfur tetrafluoride at a temperature range of —10 to +10° C. for 1 to 24 hours in the presence of hydrogen fluoride to form the corresponding 5α,6,6-trifluoro compound;

(d) heating the product of step (c) with a lower alkanoic anhydride in the presence of a strong organic acid at 75–150° C. to form the corresponding 17-(20)-pregnene-20-alkanoate;

(e) contacting the product of step (d) at room temperature with an organic peracid of 2–7 carbon atoms at 0–50° C. to form the corresponding 17-(20)-epoxy compound;

(f) contacting the product of step (e) with an aqueous alkali metal hydroxide in a lower alkanol to form the corresponding 17α-hydroxy-20-keto compound;

(g) contacting the product of step (f) with bromine at 0–50° C. to form the corresponding 21-bromo compound;

(h) heating the product of step (g) with anhydrous alkali metal alkanoate of a 1–4 carbon acid in an inert liquid solvent at a temperature at which the solvent remains liquid for 1–10 hours, and recovering the desired compound.

References Cited

UNITED STATES PATENTS 3,174,965  3/1965  Lincoln et al. _____ 260—239.5
3,223,717  12/1965  Bowers et al. _____ 260—397.4
3,546,215  12/1970  Fried _____ 260—239.55

HENRY A. FRENCH, Primary Examiner

U.S. Cl. X.R.

260—397.4, 397.47, 397.5, 999

UNITED STATES PATENT OFFICE
CERTIFICATE OF CORRECTION

Patent No. 3,814,751  Dated June 4, 1974

Inventor(s) George Albert Boswell, Jr.

It is certified that error appears in the above-identified patent and that said Letters Patent are hereby corrected as shown below:

Col. 3, compound 8 should be:

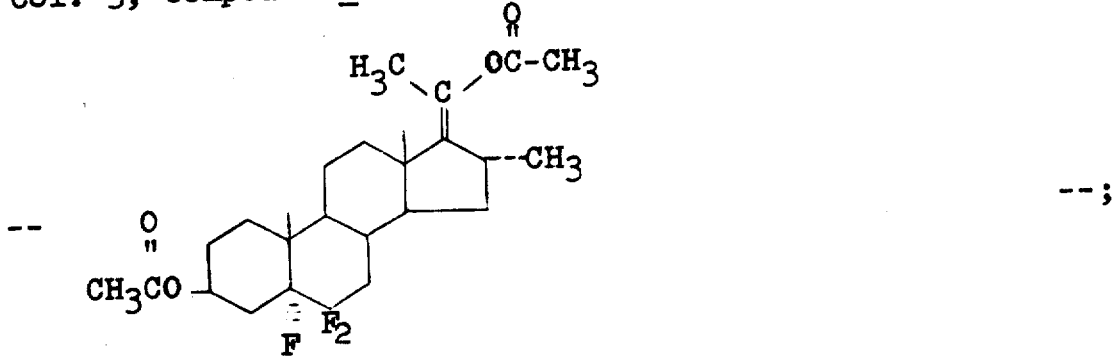

--;

Col. 11, line 45, correct the spelling of "-oxidopregnane-";

Col. 16, line 9, the top part of compound (A) should be:

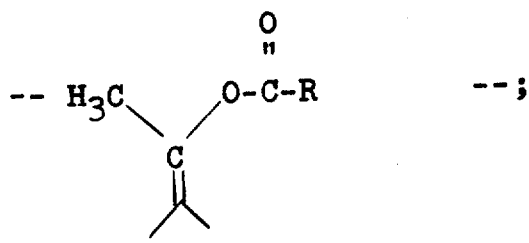

--;

Col. 16, line 21, the top part of compound (B) should be:

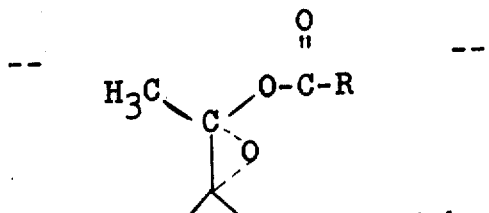

Signed and sealed this 26th day of November 1974.

(SEAL)
Attest:

McCOY M. GIBSON JR.
Attesting Officer

C. MARSHALL DANN
Commissioner of Patents